Dec. 23, 1969  D. H. CAMPBELL  3,485,290

METHOD OF MAKING A ROCKET NOZZLE

Filed Sept. 14, 1966

INVENTOR.
DANIEL H. CAMPBELL

BY Jack N. McCarthy

AGENT

United States Patent Office

3,485,290
Patented Dec. 23, 1969

3,485,290
METHOD OF MAKING A ROCKET NOZZLE
Daniel H. Campbell, North Palm Beach, Fla., assignor to United Aircraft Corporation, East Hartford, Conn., a corporation of Delaware
Filed Sept. 14, 1966, Ser. No. 579,300
Int. Cl. B22d 19/02
U.S. Cl. 164—105                                    10 Claims

ABSTRACT OF THE DISCLOSURE

This disclosure relates to means for forming the interior of a nozzle having uneven walls so that a throat of smooth converging and diverging sides will be presented to flow passing therethrough.

---

This invention relates to means for forming the interior of a nozzle having uneven walls so that a throat of smooth converging and diverging sides will be presented to flow passing therethrough. The invention described herein was made in the performance of work under a NASA contract and is subject to the provisions of section 305 of the National Aeronautics and Space Act of 1958, Public Law 85–568 (72 Stat. 435; 42 U.S.C. 2457).

It is an object of this invention to provide a specific method for installing a metallic throat in a necked-down portion of a passageway formed by bent tubing.

Another object of this invention is to provide a method for eliminating the scalloped cross section of a throat of a nozzle by installing a smooth throat insert therein.

A further object of this invention is to provide a specific mold for engagement with the throat of a passageway to form the outline of a nozzle therewith which can be filled with a suitable throat material.

Another object of this invention is to provide a method of forming a passageway from a plurality of tubes with a throat of material used to bond the tubes together.

A further object of this invention is to provide a metallic throat for a passageway wherein the throat is formed of a metal felt or wool impregnated with a suitable throat material. To minimize the possibility of failure between the passageway and metallic throat the felt or wool should have the same expansion rate as the material forming the original passageway. When the nozzle is originally made with a solid throat with the axis of the nozzle horizontal the felt or wool acts to retain the liquid metal in place during forming.

Other objects and advantages will be apparent from the specification and claims and from the accompanying drawings which illustrate embodiments of the invention.

When a nozzle throat or restriction is formed having a rounded profile, it may be necessary to build up the throat or restricted area to obtain a desirable profile. As is the case in rocket nozzles made from tubular construction, see U.S. Patent No. 3,004,386 and U.S. Patent No. 3,116,603, the throat or point of greatest restriction formed by the bending of the tubes cannot be made to form too sharp a throat edge during fabrication without deforming the cross-section of the tubes and restricting the flow therethrough. Therefore, in making a nozzle from tubes, it is necessary to bend the tubes to as great an extent as possible without effecting the flow therethrough and then if a different throat configuration is needed, it must be added.

Figure 1:
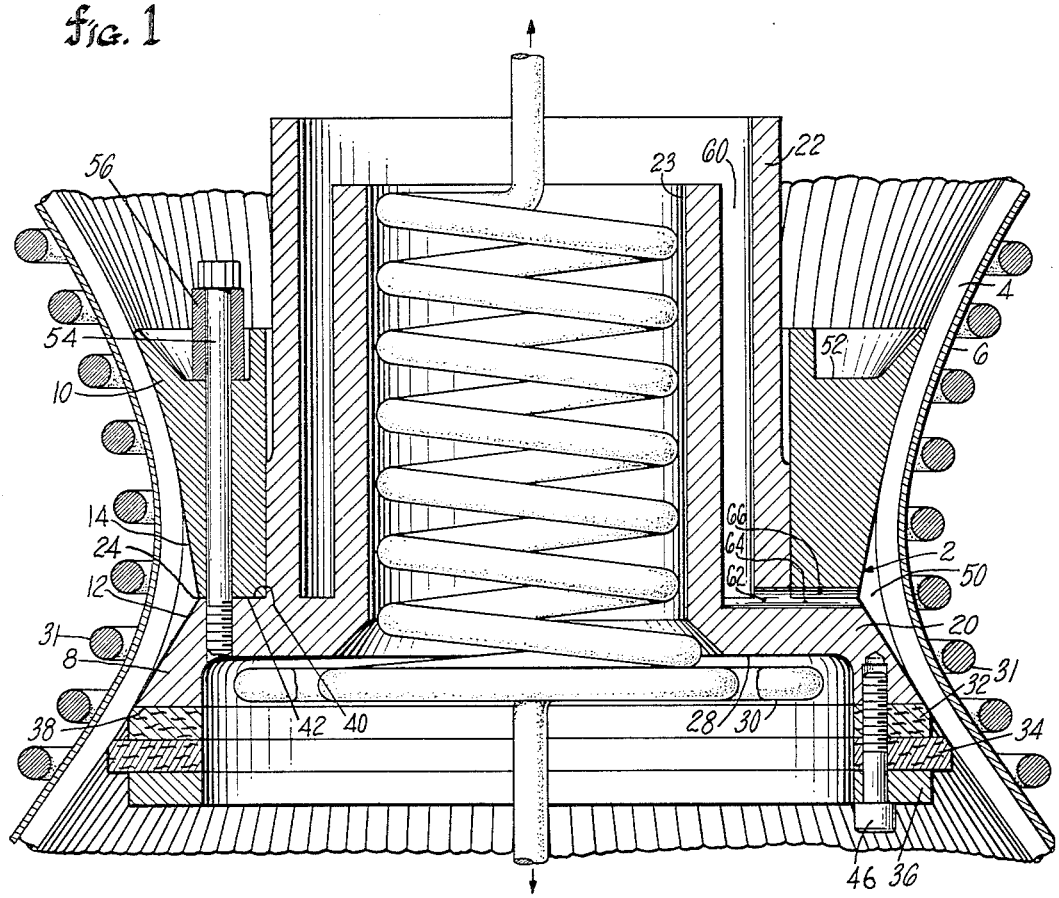
FIGURE 1 is a cross-sectional view through a nozzle throat formed from tubes with a mold or form in place for making a metal throat.

FIGURE 1 shows a composite mold 2 within a nozzle throat formed by a plurality of tubes 4. While a jacket 6 is shown, this is used merely as a thrust chamber reinforcing member and its use depends on the function for which the nozzel is intended. The composite mold 2 comprises two main parts 8 and 10 which actually have the desired contoured faces 12 and 14 of the throat configuration desired to be inserted within the tubular throat.

Part 8 of the mold comprises a bottom flange portion 20 and a projecting portion 22. As viewed in FIGURE 1, the flange portion 20 has its outer face formed as the lower contour face 12 and in position the bottom end abuts the tubes 4 with the face extending upwardly to a line 24 of minimum size for a purpose to be hereinafter described. The mold at this point extends inwardly to the upstanding portion 22 forming the top 40 of the flange which is adapted to mate with the other main portion 10 of the composite mold. The bottom of the flange is hollowed out as at 28 to allow for part of an induction heating coil element 30.

Two resilient sealing rings 32 and 34 are positioned with sealing ring 32 against the downwardly projecting annular face 38 of the flange 20. The outer edge of this sealing ring 32 is slightly greater than the flange at this point and the outer edge of the sealing ring 34 extends to a point where it meets the tubed wall. A metal ring 36 abuts the sealing ring 34 and bolts 46 fix the three rings in place with the main part 8 of the composite mold. It can be seen that with the lower part of the mold in place when the bolts 46 are tightened, the sealing rings 32 and 34 will be compressed and their outer edges will be pressed outwardly to seal the V openings between the tubes as much as possible. This is to prevent leaking at this point during forming of throat.

Figure 3:
FIGURE 3 is a view taken through a section of tubing upstream or downstream of the throat where the tubes merely form a flow passageway having one smooth side.

Part 10 of the mold comprises an annular member having a bottom annular surface 42 which is sized to mate with the top of the flange 40. The inner diameter is sized so that the part 10 will have sliding engagement with the outer surface of a part of the upstanding portion 22 of part 8 where it meets the top of the flange 40. The outer surface of the part 10 has a portion thereof formed as the upper contoured face 14 and in position, the upper part abuts the tubes 4 for a short distance. The lower edge of the contoured face 14 abuts the upper edge of the lower contour face 12 at line 24. The length of the upper portion of part 10 which extends along the length of tubes 4 is determined by the distance which it is desired to have the inner part of the passage made smooth. A cross section taken at this point is shown in FIGURE 3.

It can be seen that after the cavity 50 is filled with the insert material, it will flow upwardly between the tubes 4 closing the opened V portions. To allow for the liquid insert material flowing out and over the top of the part 10, a groove 52 is located around the face of the annular top and has its outer side surface tapered so that the liquid can run over the edge into the groove.

With both parts of the mold in place, bolts 54 are inserted through openings in the upper part 10 and threaded into the flange 20 of the lower part 8. The upper part of the bolt extending into the groove 52 has an elongated washer 56 thereon to prevent any solidifying insert material to freeze the bolt in position so that it cannot be removed.

To allow for the transfer of an insert material to within the cavity 50, an annular chamber 60 is formed adjacent the outer edge of the upstanding portion 22 of part 8 and extends downwardly to a point adjacent the top of the flange 40. At this point, a plurality of equally spaced holes 62 are drilled through the outer wall of the upstanding portion 22 into the bottom of the chamber 60 so that semicircular grooves 64 are also formed in the top of the flange 40. Semicircular grooves 66 are also formed in the bottom surface 42 of the part 10 and, when part 10 is in its proper forming position, grooves 66 mate with grooves 64 to complete the openings from the chamber 60 to the cavity 50. It can be seen that a liquid in chamber 60 will run through the openings 62 and the openings formed by grooves 64 and 66 into the cavity 50. In one mold constructed, eight (8) openings 62 were used. The head or height of liquid in the chamber 60 governs the height to which a fluid will rise in the cavity 50 and into the V grooves along the tubes 4 upwardly.

To control the heating of rocket parts and liquefication of metal which is to be made into a nozzle throat insert, induction heating coils 30 and 31 are used. The heating coil 30 extends into the hollowed out portion 28 of the flange portion 20 and up a center opening 23 of the upright projecting portion 22. The other coil 31 is placed around outer side of the nozzle with the coils being equally spaced from the nozzle so that the temperature can be controlled more accurately.

The surface of the inner part of the tubes or nozzle that is to contact the insert material should have the surface prepared so that the insert material will satisfactorily adhere thereto. The mold is made from a material having the same rate of expansion as the tubes 4 and a melting temperature which will permit the mold to properly perform its function, that is, support the liquid insert material during operation of the method described below.

Figure 2:
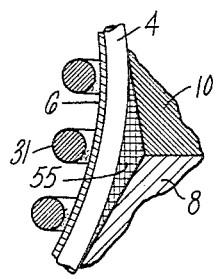
FIGURE 2 is a view showing a metal felt or other porous filler material placed in the opening formed by the mold with the tubes.

FIGURE 2 shows a modification wherein a metal felt or metal wool 55 of the same material as tube 4, or of a material having the same expansion rate, is placed in the cavity 50 so that the material poured in the cavity will unite therewith and form an insert having a rate of expansion closer to that of the tubes 4.

OPERATION

A nozzle having a throat which requires an insert is positioned as the nozzle in FIGURE 1 and the part 8 of the composite mold 2 is positioned from the bottom of the nozzle and the part 8 is positioned from the top of the nozzle until faces 40 and 42 abut. Bolts 54 are then inserted and drawn tight affixing the mold in its proper place. Bolts 46 are then tightened to seal the area where the lower end of part 8 of the composite mold meets the inner sides of the tubes 4. If the sealing provided by the rings 32 and 34 is not entirely satisfactory, other means can be used to seal from the underside of the nozzle.

An induction coil 30 is placed within the flange 20 and upstanding portion 22 of the main part 8 with both ends connected to proper control equipment as indicated by the arrows. An induction coil 31 is placed around the outer part of the nozzle adjacent the tubes to provide heat from that side. This coil 31 is connected to proper control equipment in the same manner as coil 30. Material to be used to form the nozzle insert is then placed in the chamber 60 to await the heating thereof. This material can be in the form of rods or bars placed lengthwise up and down and extending above the top of the upstanding portion 22.

Before the controls for the induction coils are turned on, the nozzle is made level and a plane taken through the line 24 is made parallel to a horizontal surface. The coils 30 and 31 are turned on and controlled to bring the temperature of the mold and cooperating nozzle to at least the temperature at which the material to be used to form the nozzle insert is liquidous. During this operation, at any given time the two difference in temperature between the mold and nozzle should be kept within a range so that neither distortion of the nozzle contour nor separation of mold from the nozzle surface takes place. A check should then be made to see if the metal is flowing into the mold cavity. If not, only the heat on the inner coil is controlled to obtain better metal flow. If the stack of metal in the chamber becomes low, insert additional strips and bars. A check should then be made to see if there is any leaking under the sealing rings.

Maintain this position for ten minutes and then start the cooling cycle. Reduce the heat on the inner coil and outer coil uniformly to minimize any stresses being placed on the rocket parts. When the nozzle and mold have been completely cooled down, the coils are removed along with the two mold halves, and the nozzle or throat portion formed by the tubes 4 now has a smooth throat section of smaller diameter and smoother flow surface.

In the formation of a throat insert in a rocket nozzle made of tubes using silver for the insert material the following specific steps were used. First the inner coil was turned on until the temperature of the parts 8 and 10 of the mold was approximately 600° F. This was done by thermocouples placed around the mold part 10 which were checked by an operator. These thermocouples can be placed at various locations within the upper member 10 by drilling holes down through the part itself from the bottom of groove 52. The outer coil was then heated until thermocouples indicated that the exterior of the tubes and jacket 6 at its inner necked-down part was also approximately 600° F.

The inner and outer coils were then controlled to increase the heat with readings being constantly taken of the thermocouples to insure that the temperature difference between the two areas being heated by the two coils did not differ more than 100° F. at any specific time so that neither distortion of the nozzle contour nor separating of mold from the nozzle surface takes place. At this time the temperature was taken to approximately 1800° F. by increments of approximately 200° F. with "hold" or "soak" periods of 10 minutes at the end of each increment to allow the temperature to equalize throughout.

A check was then made to see if the silver was flowing into the mold cavity. Since it was flowing it was not necessary to add any more heat. Further there had been enough "bars" of silver in the chamber 60 to start with so none had to be added. There were no leaks.

In cooling, the heat was reduced on the inner coil and outer coil to avoid any stress on the nozzle. From the cast temperature of approximately 1800° F. the temperature of the mold, nozzle and insert was reduced in a series of steps ranging from 125° F. to 225° F. with a "hold" or "soak" period of from 10 to 15 minutes between each step for equalization of heat throughout.

While the description above sets forth a device and operation thereof for placing a metal throat insert in an existing passageway, the following description sets forth the steps for forming a passageway from a plurality of tubes or rods brazed together with said passageway having a throat formed therein from the material used to braze the tubes together.

In this method a two part mold is used similar to the mold 2 shown in FIGURE 2, however the mold halves extend from their mating faces 40 and 42, respectively, to the cooperating ends of the tubes which are to form a passageway. For example, if a passageway was to be formed of the tubes 4 of the length as shown in FIGURE 2, the mold halves would extend to the ends of the tubes at the desired contour. Further, the holes 62, grooves 64 and 66 are omitted as are the sealing rings 32 and 34 and the metal ring 36. Means are provided to support the two part mold in a horizontal position, that is with its axis horizontal, and permit rotation thereof. This can be done by having a shaft section fixed to and extending from each free end of each mold half 8 and 10. An electric motor with interconnecting gearing or other drive means can be used to turn either shaft section.

When the mold is so supported, tubes 4 are laid in place with metal felt or wool 55 filling the cavity 50 as shown in FIGURE 2. Brazing material is then placed around said tubes and in contact therewith to provide the material for brazing the tubes together along their length, and filling the cavity 50 around the felt or wool 55. Means are provided for maintaining the tubes 4 and brazing material in position for the heating cycle. This means can be bands placed around the tubes at various locations along the length thereof. If bands are used and it is desired that they be removable at the end of the process a releasing agent should be placed on the bands or other known precautions taken.

The assembly is then heated uniformly throughout and brought up to the melting point of the brazing material. Before the brazing material reaches its melting point the assembly is rotated. This rotation permits the brazing material to flow into the cavity 50 around the porous felt or wool 55 to fill the cavity and between the tubes 4 for brazing the tubes together. This brazing material flows by reason of capillary action and gravity as a combination thereof. When the cavity 50 has been filled around the felt or wool 55 and the tubes have all been formed along their lines of contact the assembly is cooled uniformly throughout as necessary to maintain any critical dimensions.

If it is desirable to have the interior of the passageway smooth throughout, a strip of metal felt or wool is placed along each inner tube valley facing the mold, extending for the length of the passageway. If only a short section is needed to be smooth, then only strips of felt or wool of that length would be used.

In a construction of a passageway by this method, tubes were used which were made of stainless steel. The mold halves were also made of stainless steel as was the felt 55. The brazing material was silver and the mold was rotated as 1 r.p.m. during brazing. A releasing agent was placed on the surface of the mold and the bands were permitted to be brazed to the tubes.

It is to be understood that the invention is not limited to the specific embodiments or methods herein illustrated and described, but may be used in other ways without departure from its spirit as defined by the following claims.

I claim:
1. A method of forming a sharper metallic annular throat constriction on a rounded metallic annular throat constriction of a flow passageway comprising:
 (1) cleaning the surface on which the sharper annular throat constriction is to be formed,
 (2) enclosing an annular throat space by enclosing an annular throat area having a desired sharper throat constriction around the interior of the rounded throat constriction of the flow passageway and providing an inlet,
 (3) containing metallic insert material within said flow passageway adjacent the area where said sharper throat constriction is to be formed so that the material will flow through the inlet into said throat space when liquefied,
 (4) heating the material and rounded throat constriction gradually until the material is liquefied and flows through the inlet filling said throat space, and
 (5) reducing the temperatures gradually down to ambient.
2. A method as set forth in claim 1 wherein the following step is included:
 (6) placing a metallic felt or wool in said annular throat space so that the material when liquefied will be aided in entering the annular throat space by capillary action.
3. A method as set forth in claim 2 wherein the metallic felt or wool has the same rate of expansion as the metal of the flow passageway.
4. A method as set forth in claim 1 wherein the interior of the flow passageway has an uneven contour and step (2) includes forming a desired sharper throat constriction having smooth inner surface.

5. A method as set forth in claim 1 wherein step (4) heating is done within the flow passageway and around the exterior of the flow passageway.
6. A method as set forth in claim 1 whereby prior to step (4), the axis of the flow passageway is placed in a vertical position and the following step is included:
 (6) sealing the throat area so that liquefied material will be confined to the throat space.
7. A method of forming a metallic throat insert of a desired contour in a metallic flow passageway comprising:
 (1) cleaning the surface on which the throat insert is to be formed so as to provide for proper adhering between the surface and the throat insert,
 (2) placing one part of a mold within said passageway with one end touching said passageway and having a first contoured face which forms with said passageway one area of the throat being formed,
 (3) placing a second part of a mold within said passageway with one end touching said passageway and having a second contoured face which forms with said passageway the other area of the throat being formed,
 (4) fixing said mold parts in position in said passageway with the two areas of the throat joined to form the mold cavity representing the contour of the desired throat insert,
 (5) placing a metallic filler material within said passageway so as to be heated with said mold and passageway and flow into said mold cavity by gravity when liquefied,
 (6) heating said mold and said passageway gradually until the material is liquefied and fills the new defined throat mold cavity formed by the first and second contoured faces and passageway, and
 (7) reducing mold and passageway temperatures down to ambient.
8. A method as set forth in claim 7 wherein step (6) the heating was done by heating the mold to 600° F. and then heating the passageway to approximately 600° F., the heating was then increased and taken to the value necessary to liquefy the material by increments of approximately 200° F. with "hold" periods of 10 minutes at the end of each increment.
9. A method as set forth in claim 7 wherein step (7) the mold and passageway temperatures were reduced in a series of steps ranging from 125° F. to 225° F. with a "hold" period of from 10 to 15 minutes between each step.
10. A method as set forth in claim 7 wherein a metallic felt or wool is placed in said throat space so that the metallic filler material when liquefied will be aided in entering said throat space by capillary action.

References Cited

UNITED STATES PATENTS

| | | | |
|---|---|---|---|
| 2,679,079 | 5/1954 | Lyons | 164—102 X |
| 718,141 | 1/1903 | Monson et al. | 164—108 X |
| 2,207,150 | 7/1940 | Hirsch et al. | 164—80 X |
| 2,222,525 | 11/1940 | Zink | 164—80 X |
| 2,445,364 | 7/1948 | Rankin et al. | 164—61 |
| 2,951,336 | 9/1960 | Mueller | 164—108 X |
| 2,957,214 | 10/1960 | Kuharski. | |
| 3,254,381 | 6/1966 | Brown et al. | 164—80 |
| 1,870,867 | 8/1932 | Pike et al. | 164—102 |
| 1,534,815 | 4/1925 | Setter | 164—92 |

J. SPENCER OVERHOLSER, Primary Examiner

V. K. RISING, Assistant Examiner

U.S. Cl. X.R.

148—3; 164—51, 80, 100